US005748690A

United States Patent [19]
Matsuura et al.

[11] Patent Number: 5,748,690
[45] Date of Patent: May 5, 1998

[54] CONSTRUCTION METHOD OF NUCLEAR REACTOR REINFORCED CONCRETE CONTAINMENT VESSEL AND DIAPHRAGM FLOOR STRUCTURE OF NUCLEAR REACTOR REINFORCED CONCRETE CONTAINMENT VESSEL

[75] Inventors: Tadashi Matsuura; Kouichi Ushiroda, both of Hitachi; Tatsuo Makita, Ushiku; Masakazu Nagase, Hitachi; Akinori Tajiri, Hitachi; Naoto Yoshida, Hitachi; Shigeru Nanba, Tokyo; Koichi Saito, Hitachinaka, all of Japan

[73] Assignees: Hitachi, Ltd.; Hitachi Plant Engineering & Construction Co., Ltd., both of Tokyo, Japan

[21] Appl. No.: 614,390

[22] Filed: Mar. 12, 1996

[30] Foreign Application Priority Data

Mar. 17, 1995 [JP] Japan ............................. 7-058525

[51] Int. Cl.⁶ .......................... G21C 13/00; G21C 21/00
[52] U.S. Cl. ................. 376/260; 376/293; 52/612; 52/745.06; 264/34
[58] Field of Search ................. 376/260, 293, 376/294, 295, 296, 461; 52/294, 612, 745.05, 745.06, 745.13; 264/34, 35

[56] References Cited

U.S. PATENT DOCUMENTS 4,259,154  3/1981  Niino et al. .......................... 376/293
5,119,598  6/1992  Tajiri et al. ......................... 376/293

*Primary Examiner*—Daniel D. Wasil

[57] ABSTRACT

In a method of construction of a reinforced concrete diaphragm floor of a nuclear reactor reinforced concrete containment vessel, a bottom surface of the diaphragm floor is provided in the form of an iron plate. The iron plate, an iron bar beam portion for supporting the load provided by concrete during a concrete pouring time, and a reinforcing bar member to be buried in the concrete of the diaphragm floor are assembled outside of a building in which the nuclear reactor is to be embodied. The above members are carried using lifting machinery and are set in a permanent receiving member which is provided on both a main body of the nuclear reactor pressure vessel and a steel member serving as a concrete mold frame of an outer wall of the nuclear reactor reinforced concrete vessel. A concrete pouring is carried out in stages so as to form successive layers of concrete during plural pouring times. After a first concrete layer has completed and the strength of the concrete layer has been established after hardening, the second concrete layer is poured on the first layer, which aids in supporting the weight of the poured concrete.

11 Claims, 9 Drawing Sheets

5,748,690

CONSTRUCTION METHOD OF NUCLEAR REACTOR REINFORCED CONCRETE CONTAINMENT VESSEL AND DIAPHRAGM FLOOR STRUCTURE OF NUCLEAR REACTOR REINFORCED CONCRETE CONTAINMENT VESSEL

BACKGROUND OF THE INVENTION

The present invention relates to a method of construction of a nuclear reactor reinforced concrete containment vessel and a diaphragm floor structure of a nuclear reactor reinforced concrete containment vessel. More particularly, the invention relates to a method of construction of a nuclear reactor reinforced concrete containment vessel (RCCV) and a diaphragm floor structure of a nuclear reactor reinforced concrete containment vessel for use in an advanced boiling water type nuclear reactor power plant (ABWR).

A conventional nuclear reactor reinforced concrete containment vessel (RCCV) for use in an advanced boiling water type nuclear reactor power plant (ABWR) has a firm reinforced concrete structure so as to be able to bear an excessive pressure which it may receive during an earthquake or a nuclear plant accident.

A diaphragm floor for a nuclear reactor reinforced concrete containment vessel (RCCV) comprises a reinforced concrete floor having a flat and wide area from a structural aspect.

A reinforced concrete member has a strength sufficient to bear a compression load and a bending load in a solidified condition. However, during the concrete pouring time, the concrete floor itself forms a fluid body, so that it is impossible for the concrete member itself to bear any load, and further the concrete member itself has a large weight. Thereby, in order to form a flat floor using concrete, it is necessary to fully support the weight of the concrete from underneath the reinforced concrete flat floor.

In the conventional method of supporting the weight of the diaphragm floor during the concrete pouring time, a mold frame for constructing the diaphragm floor is supported by a temporary steel member, and further a temporary sub-support member is erected from a floor portion at the lowest portion of the nuclear reactor reinforced concrete containment vessel (RCCV), so that the concrete can be supported. (A conventional method 1)

Further, until the diaphragm floor becomes sufficiently hardened, the temporary sub-support member must be retained on the floor portion at the lowest portion of the nuclear reactor reinforced concrete containment vessel (RCCV).

Due to the existence of the temporary sub-support member, it is necessary to avoid the obstruction of the other workings in the area (hereinafter called a "wet well") below the diaphragm floor.

The temporary reinforced support member adds the necessary additional strength to support the diaphragm floor weight during the concrete pouring time from an inner wall of the wet well of the nuclear reactor reinforced concrete containment vessel (RCCV), and further it is necessary to disassemble and to carry the above temporary reinforcement member for supporting the diaphragm floor into the wet well for this purpose.

These temporary reinforced members are fixed from both sides of a base of the nuclear reactor pressure vessel (RPV) and a side of the nuclear reactor reinforced concrete containment vessel (RCCV), and support an iron plate mold frame for the diaphragm floor is received. (A conventional method 2)

In the above stated conventional methods 1 and 2, the temporary sub-support member or the reinforced support member is fully withdrawn from the wet well after the strength of the diaphragm floor is established, and the withdrawn temporary sub-support member or the withdrawn reinforced support member is transported to the outside of the nuclear reactor building construction.

In both of the conventional methods 1 and 2, the concrete pouring of the diaphragm floor is completed in one operation.

According to the concrete member pouring method for forming a diaphragm floor utilizing the former conventional method 1, it is impossible to remove the temporary sub-support member in the wet well, which is supported from the lowest portion of the nuclear reactor reinforced concrete containment vessel (RCCV), until the solidification of the concrete is completed and the concrete member strength is able to fully withstand the diaphragm floor weight itself.

For of the above stated reasons, it is possible to begin working in an interior portion of the wet well only after the completion of the diaphragm floor.

Further, according to the method of pouring the concrete to form the diaphragm floor utilizing the above stated latter conventional method 2, a large amount of materials is necessary to construct the temporary reinforcement member so that the temporary reinforcement member will have the strength necessary for bearing a great weight during the concrete pouring time.

As a result, a large time is necessary for carrying in and assembling the temporary reinforcement member, and further a large time is necessary for removing the temporary reinforcement member after the completion of the diaphragm floor.

In both conventional methods 1 and 2 stated above, both the temporary reinforcement member and the support member, including the sub-support member, which supports the concrete member weight during the concrete pouring time during the constructing of the diaphragm floor, are removed after the completion of the diaphragm floor.

As above stated, the temporary member to be removed has a large amount of materials, and so as to remove the temporary member, there is only an access tunnel of the wet well portion, because the passing-through opening at the upper portion of the wet well is now blocked by the diaphragm floor.

Therefore, it is necessary to transport the temporary member to be removed through the above stated access tunnel provided in the wet well by providing a passage in the nuclear reactor building construction. Thereby, to carry the temporary member through the passage, it is necessary to fully disassemble the temporary member into small parts and to also fully cut some parts of the temporary member into small sizes.

Further, it becomes hard to effect the transportation of the steel member used as the support member.

As one conventional prior art method, a method of construction of a top slab for a nuclear reactor containment building is disclosed in, for example, U.S. Pat. No. 5,119,598.

SUMMARY OF THE INVENTION

An object of the present invention is to provide a method of construction of a nuclear reactor reinforced concrete containment vessel and a structure of a diaphragm floor of a nuclear reactor reinforced concrete containment vessel, wherein the amount of materials necessary for constructing the nuclear reactor reinforced concrete containment vessel can be reduced and the time required for construction of the nuclear reactor reinforced concrete containment vessel can be reduced.

A first aspect of the present invention resides in a construction method for a nuclear reactor reinforced concrete containment vessel, which comprises the steps of: providing a beam member for supporting the weight of concrete; pouring concrete on said beam member to a level less than a full thickness of a completed diaphragm floor to provide a concrete layer; allowing the poured concrete layer to harden; and pouring concrete at least one more time over the hardened concrete layer, whereby a diaphragm floor of the nuclear reactor reinforced concrete containment vessel is obtained.

A second aspect of the present invention resides in a construction method for a nuclear reactor reinforced concrete containment vessel, in which a diaphragm floor is installed between a dry well and a wet well of a nuclear reactor reinforced concrete containment vessel for storing a nuclear reactor pressure vessel being supported by a pedestal member, which method comprises the steps of: supporting a beam member between the pedestal member and a wall of the nuclear reactor reinforced concrete containment vessel at an installation position of the diaphragm floor; supporting a concrete mold frame on the beam member; arranging a reinforcement member over the concrete mold frame; pouring concrete to a level less than a full thickness of a completed diaphragm floor to provide a concrete layer; allowing the poured concrete layer to harden; and pouring concrete at least one more time over the hardened concrete layer, whereby a diaphragm floor of the nuclear reactor reinforced concrete containment vessel is obtained.

A third aspect of the present invention resides in a construction method of a nuclear reactor reinforced concrete containment vessel according to the second aspect and which further comprises the steps of: manufacturing in advance a diaphragm module using at least one of the concrete mold frame and a reinforcement member, and the beam member; setting the diaphragm module so as to mount the beam member on the pedestal member and a bracket member which is installed in advance on a wall of the nuclear reactor reinforced concrete containment vessel; and supporting the beam member using the pedestal member and the wall of the nuclear reactor reinforced concrete containment vessel.

A fourth aspect of the present invention resides in a construction method for a nuclear reactor reinforced concrete containment vessel according to the third aspect and which further comprises the steps of: preparing the diaphragm module by integrally embodying at least one of the concrete mold frame and a reinforcement member, and the beam member, wherein machinery and materials are integrally arranged in the wet well.

A fifth aspect of the present invention resides in a construction method for a nuclear reactor reinforced concrete containment vessel according to the second or third aspect and which further comprises the steps of: building the wall of the nuclear reactor reinforced concrete containment vessel to a height less than an installing position of the diaphragm floor; mounting the bracket member on the wall, the bracket member having a length sufficient to reach to an installing position of the diaphragm floor; and mounting the beam member on the bracket member.

A sixth aspect of the present invention resides in a construction method of a nuclear reactor reinforced concrete containment vessel according to any one of the first through fifth aspects, wherein the strength of the beam member is less than an amount which is able to support the weight of the concrete member having the required thickness of the completed diaphragm floor; and the strength of the beam member is set at a level which is sufficient to support the weight of the concrete layer having a thickness less than the thickness of the completed diaphragm floor.

A seventh aspect of the present invention resides in a diaphragm floor made of reinforced concrete which is supported by a pedestal member of a nuclear reactor reinforced concrete containment vessel and a wall of the nuclear reactor reinforced concrete containment vessel, comprises: a beam member supporting the bottom of the diaphragm floor on the pedestal member of the nuclear reactor reinforced concrete containment vessel and the wall of the nuclear reactor reinforced concrete containment vessel; a concrete mold frame supported by the beam member; a reinforcement member provided on the concrete mold frame; and a concrete member formed on the concrete mold frame by successively pouring plural layers of concrete and allowing each layer to harden individually until a thickness of the reinforcement member is obtained; wherein a strength of the beam member has a strength less than a strength which is able to support the weight of concrete having the thickness of the diaphragm floor, the strength of the beam member being set to an amount which is able to support the weight of concrete having a thickness less than the thickness of the completed diaphragm floor.

According to the first aspect of the present invention, the concrete of the reinforced concrete diaphragm floor is poured initially to a thickness less than the required total thickness of the completed diaphragm floor and the load during the concrete pouring time is supported by the beam member, whereby it is possible to support the load of additional concrete layers formed during the next time and subsequent times of concrete pouring using the strength afforded by the complex structure comprised of the beam member and the reinforced concrete member, which is formed by the consolidation of the thinner concrete layers without need for a temporary support member.

According to the second aspect of the present invention, the concrete of the diaphragm floor is poured to a thickness less than the total thickness and the load during the pouring time is supported by the beam member, whereby it is possible to support the load of concrete poured during the next time and subsequent times to form additional layers of concrete using the strength afforded by the complex structure comprised of the beam member and the reinforced concrete structure without need for a temporary support structure.

According the third aspect of the present invention, the member for constituting the diaphragm floor is made by modularization, whereby it is possible to mount the beam member on the bracket member, and further it is possible to set the beam member at a predetermined position.

According the fourth aspect of the present invention, the machinery and materials to be installed in the wet well and the member for constituting the diaphragm floor are made by the modularization, whereby it is possible to mount the beam member on the bracket member at the same time and further it is possible to set the beam member at a predetermined position.

According the fifth aspect of the present invention, even when the construction condition of the wall of the nuclear reactor reinforced concrete containment vessel does not extend sufficiently to reach the installing position of the diaphragm floor, the beam member of the diaphragm floor is supported by extending the bracket member over the upper portion of the installing position of the diaphragm floor, whereby it is possible to speed up the construction of the diaphragm floor.

According to the sixth aspect of the present invention, even when the strength of the beam member is not sufficient to bear the weight of the total thickness of the concrete of the diaphragm floor at one time, because the diaphragm floor is divided into successively poured plural layers, whereby it is possible for the beam member to support the first concrete pouring load and the for reinforced concrete layer poured the first time to aid the beam in supporting the next layer.

According to the seventh aspect of the present invention, the thin concrete layer of the diaphragm floor poured the first time is supported by the beam member, and the concrete layer poured the next time is supported by the strength of the complex structure comprised of the beam member and the first thin concrete layer, whereby it is possible to reduce the load requirement of the beam member in the construction of the nuclear reactor reinforced concrete containment vessel.

DESCRIPTION OF THE INVENTION

Hereinafter, one embodiment of a method of construction of a nuclear reactor reinforced concrete containment vessel and a diaphragm floor structure of a nuclear reactor reinforced concrete containment vessel according to the present invention will be explained with reference to the drawings.

Figure 1:
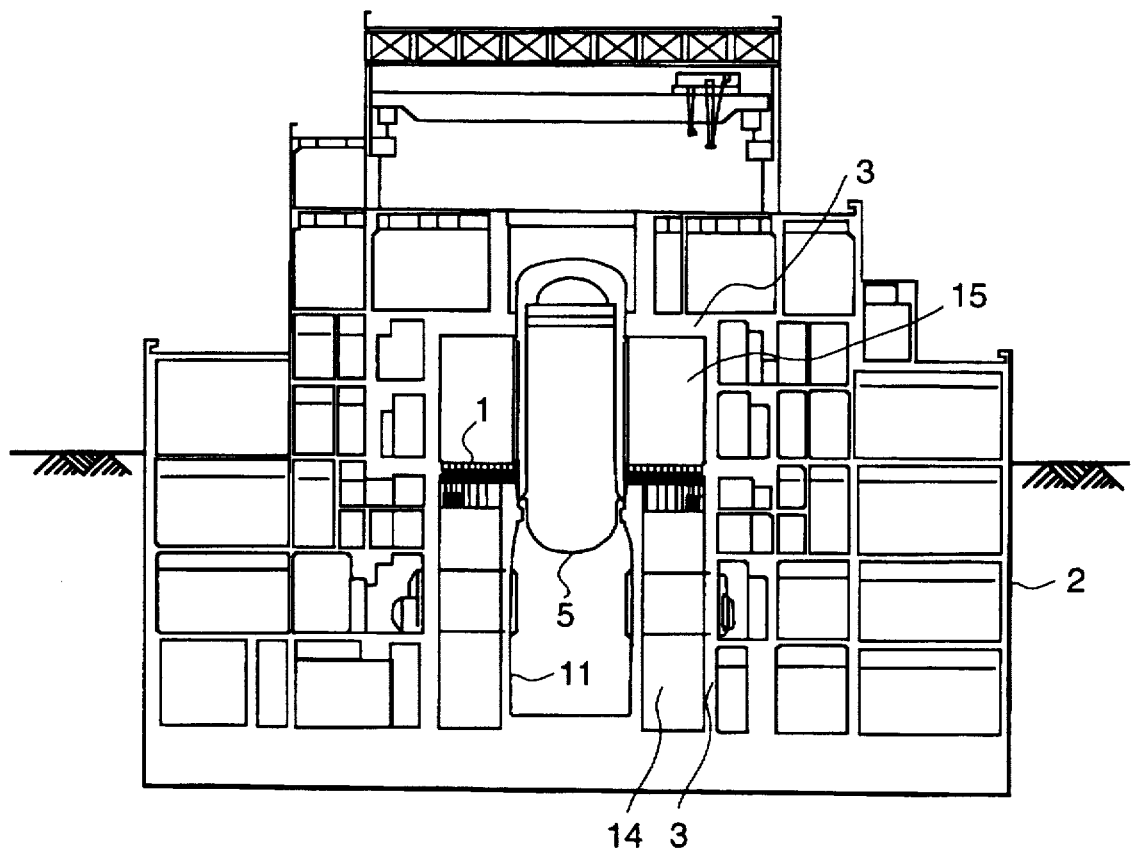
FIG. 1 is a longitudinal cross-sectional view showing a nuclear reactor building construction forming one embodiment of a nuclear reactor reinforced concrete containment vessel according to the present invention.

FIG. 1 is a longitudinal cross-sectional view showing a nuclear reactor building construction forming one embodiment of a nuclear reactor reinforced concrete containment vessel according to the present invention.

An advanced boiling water type nuclear reactor power plant (ABWR) constructed in accordance with one embodiment of a nuclear reactor reinforced concrete containment vessel of the present invention has a nuclear reactor reinforced concrete containment vessel (RCCV) 3 at a central portion of a nuclear reactor building construction 2.

The nuclear reactor reinforced concrete containment vessel (RCCV) 3 is formed with a cylindrical shape structure member having a diameter of about 30 m. At a central portion of the nuclear reactor reinforced concrete containment vessel (RCCV) 3, a pedestal member 11 and a nuclear reactor shielding wall 12 are provided.

The pedestal member 11 of a nuclear reactor pressure vessel (RPV) 5 is set by mounting the nuclear reactor pressure vessel (RPV) 5, and the nuclear reactor shielding wall 12 is provided on the pedestal member 11 so as to surround an outer periphery of the nuclear reactor pressure vessel (RPV) 5.

The nuclear reactor reinforced concrete containment vessel (RCCV) 3 has a structure in which a whole containment vessel including both a floor portion and a wall portion is formed of a thick reinforced concrete member structure, thereby the nuclear reactor reinforced concrete containment vessel (RCCV) 3 can fully bear a high pressure and a large vibration.

A region is formed by an outer wall 13 of the nuclear reactor reinforced concrete containment vessel (RCCV) 3, the pedestal member 11 of the nuclear reactor pressure vessel (RPV) 5 and the nuclear reactor shielding wall 12.

The above stated region is divided into a wet well 14 at a lower portion and a dry well 15 at an upper portion by a diaphragm floor 1. The diaphragm floor 1 is installed using the embodiment according to the present invention.

FIG. 1 shows the positions of the nuclear reactor reinforced concrete containment vessel (RCCV) 3 and the diaphragm floor 1 in the completed nuclear reactor building construction 2.

Next, a procedure for installing the diaphragm floor 1 using the embodiment according to the present invention will be explained.

The position for setting the diaphragm floor 1 is substantially consistent with an upper end position of the pedestal member 11 of the nuclear reactor pressure vessel (RPV) 5.

The pedestal member 11 of the nuclear reactor pressure vessel (RPV) 5 comprises a structure body which provides air ventilating hole units at an interior portion. A surface of the pedestal member 11 is constituted by an iron plate member 21 which serves as a concrete mold frame.

The iron plate member 21 of the pedestal member 11 of the nuclear reactor pressure vessel (RPV) 5 provides a bracket member 31 made of steel and this bracket member 31 receives the diaphragm floor 1.

As a method for installing the steel bracket member 31 for receiving the diaphragm floor 1 on the pedestal member 11 of the nuclear reactor pressure vessel (RPV) 5, the steel bracket member 31 may be welded to the iron plate member 21 of the pedestal member 11 of the nuclear reactor pressure vessel (RPV) 5.

Further, the steel bracket 31 has a projection member 32 which is buried in the pedestal member 11 of the nuclear reactor pressure vessel (RPV) 5. When the concrete is poured in the pedestal member 11 of the nuclear reactor pressure vessel (RPV) 5, then the above projection member 32 is buried. As a result, it is possible to strongly fix the bracket member 31 using the projection member 32.

Besides, a side of the outer wall 13 of the nuclear reactor reinforced concrete containment vessel (RCCV) 3 is covered by a concrete member mold frame (RCCV layer) 22 made of steel.

At a side of the concrete member mold frame (RCCV layer) 22, another bracket member 31 made of steel for receiving the diaphragm floor 1 is mounted in a manner similar to that provided on the side of the pedestal member 11 of the nuclear reactor pressure vessel (RPV) 5.

As a method for installing the steel bracket member 31 in the concrete member mold frame (RCCV layer) 22, the steel bracket member 31 is welded to the concrete member mold frame (RCCV layer) 22.

Further, the steel bracket member 31 has a projection member 32 buried in the concrete member of the nuclear reactor reinforced concrete containment vessel (RCCV) 3. When the concrete is poured in the outer wall 13 of the nuclear reactor reinforced concrete containment vessel (RCCV) 3, then the above projection member 32 is buried. As a result, it is possible to strongly fix the steel bracket member 31 on the concrete member mold frame (RCCV layer) using the projection member 32.

Figure 2:
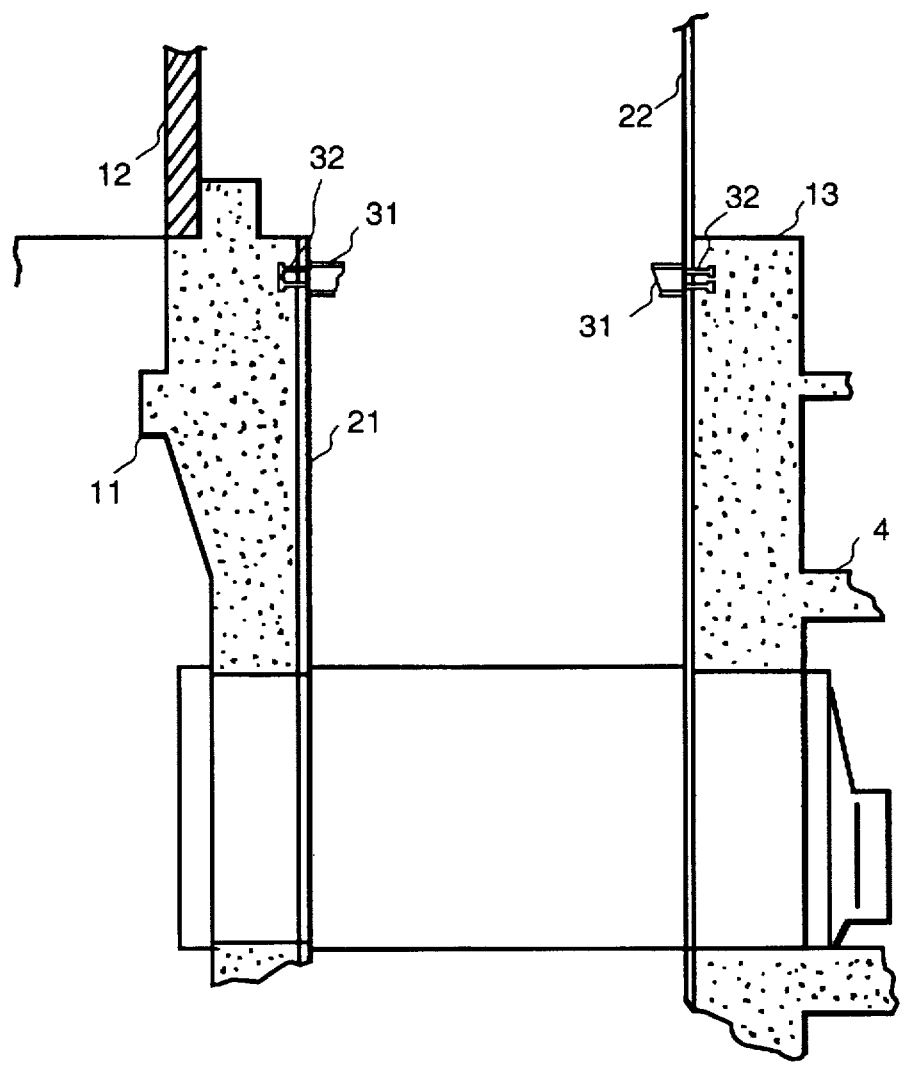
FIG. 2 is a longitudinal cross-sectional view showing the structure of a bracket member of a nuclear reactor building construction forming one embodiment of a nuclear reactor reinforced concrete containment vessel according to the present invention.

The steel bracket member 31 for receiving the diaphragm floor 1 is installed from both the side of the pedestal member 11 of the nuclear reactor pressure vessel (RPV) 5 and the side of the outer wall 13 of the nuclear reactor reinforced concrete containment vessel (RCCV) 3. In FIG. 2, the above installation condition of the steel bracket member 31 is shown.

FIG. 2 is a cross-sectional view showing a half part of the nuclear reactor reinforced concrete containment vessel (RCCV) 3 having the bracket members 31 and the projection members 32.

The forwarding way of the concrete member body building of the side of the outer wall 13 of the nuclear reactor reinforced concrete containment vessel (RCCV) 3 is controlled by the construction work progress of a common building construction part 4.

Thereby, at the time when the setting of the diaphragm floor 1 is carried out, there is a case in which the body structure is completed to a level for installing the diaphragm floor 1.

In the above case, the steel bracket member 31 for receiving the diaphragm floor 1 from both sides of the outer wall 13 of the nuclear reactor reinforced concrete containment vessel (RCCV) 3 is installed from a portion where the concrete member body of the outer wall 13 of the nuclear reactor reinforced concrete containment vessel (RCCV) 3 has been completed until a time for starting the installation of the diaphragm floor 1.

When the projection member 32 being buried in the concrete member of the nuclear reactor reinforced concrete containment vessel (RCCV) 3 is provided on the steel bracket member 31, and until the period for setting the diaphragm floor 1 when the projection member 32 is buried at a region in which the concrete member body has completed, it is possible to obtain the stronger fixing.

Figure 3:
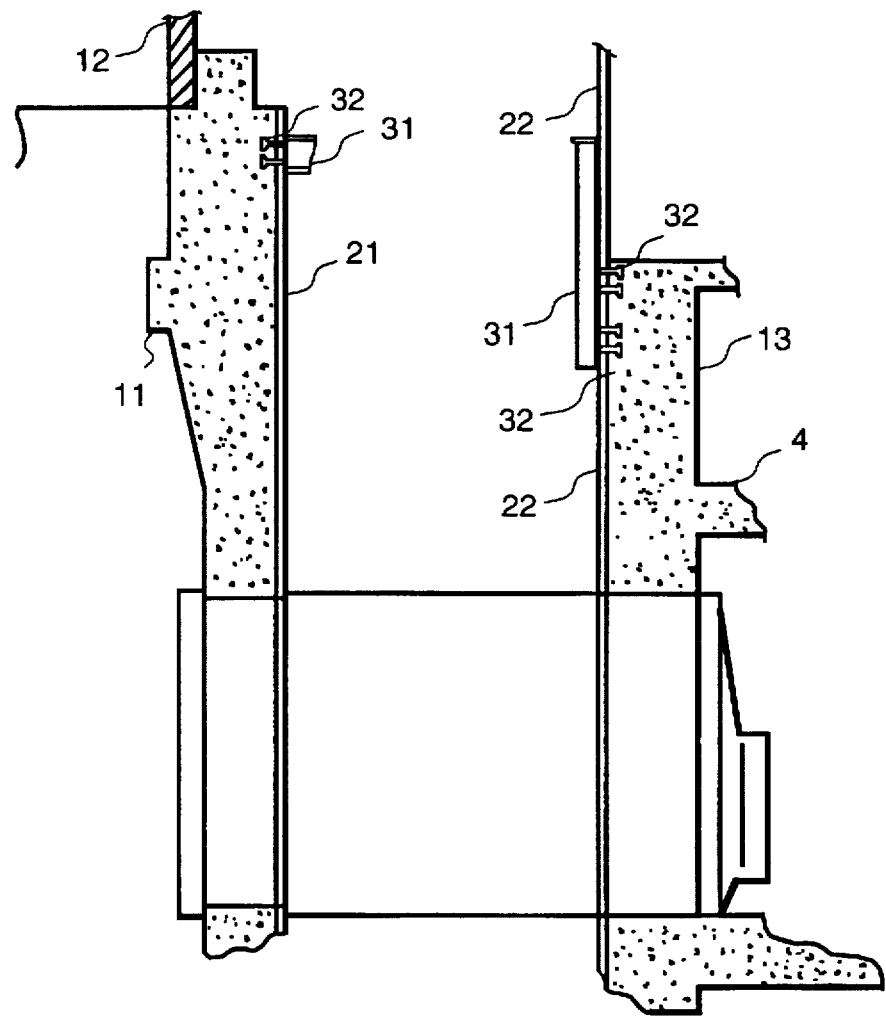
FIG. 3 is a longitudinal cross-sectional view showing the structure of a bracket member of a nuclear reactor building construction of a nuclear reactor reinforced concrete containment vessel according to the present invention.

FIG. 3 is a view showing the use of a steel bracket member 31 when the concrete member of the common building construction part 4 within the nuclear reactor building construction 2 does not reach an installing level of the diaphragm floor 1.

Figure 4:
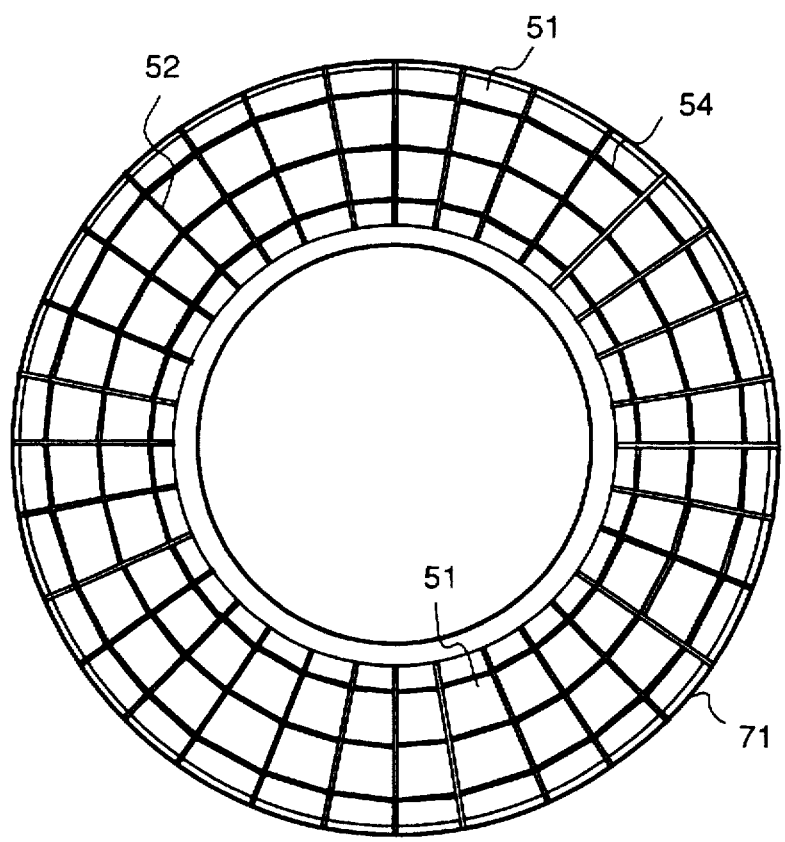
FIG. 4 is a lower plan view of a diaphragm floor module adopted by a nuclear reactor building construction of a nuclear reactor reinforced concrete containment vessel according to the present invention.
Figure 5:
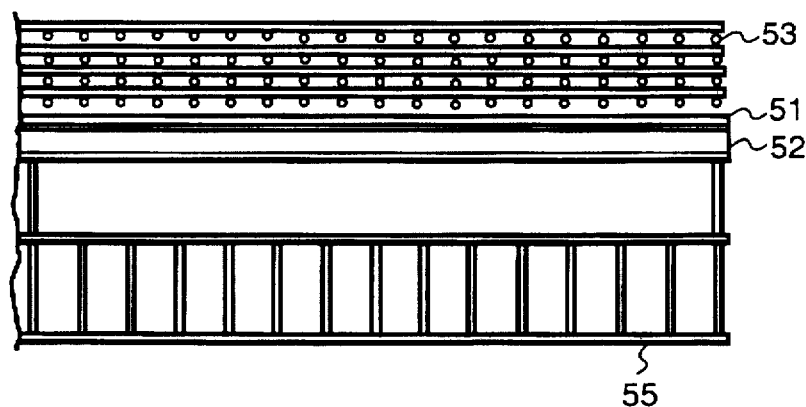
FIG. 5 is a longitudinal cross-sectional view of a part of a diaphragm floor module adopted by a nuclear reactor building construction of a nuclear reactor reinforced concrete containment vessel according to the present invention.

Next, one embodiment of a diaphragm floor module 71 will he explained, with reference to FIGS. 4 and 5. The diaphragm floor module 71 is constituted by an iron plate member 51, a beam member 52 and a reinforcement member 53.

The iron plate member 51 serves as a mold frame member made of steel and forming a bottom floor of the diaphragm floor 1. The beam member 52 is constituted by a reinforcement member for receiving a load during the concrete pouring. The reinforcement member 53 is buried in the concrete of the diaphragm floor 1.

FIG. 4 is a view showing the diaphragm floor module 71 from a lower direction and showing an arrangement of the beam member 52 for supporting the load during the concrete pouring of the diaphragm floor 1.

The diaphragm floor module 71 is formed with a circular shape which corresponds to an inner diameter of the circular shape outer wall 13 of the nuclear reactor reinforced concrete containment vessel (RCCV) 3. A central portion of the diaphragm floor module 71 is formed in a doughnut shape from which a part of the nuclear reactor shielding wall 12 for surrounding the outer wall 13 of the nuclear reactor reinforced concrete containment vessel (RCCV) 3 is omitted.

The beam member 52 supports the iron plate member 51 which serves as the concrete member mold frame of the bottom portion of the diaphragm floor module 71. This beam member 52 is arranged at the positions of the steel bracket member 31 which is installed in the side of the pedestal member 11 of the nuclear reactor pressure vessel (RPV) 5 and the side of the outer wall 13 of the nuclear reactor reinforced concrete containment vessel (RCCV) 3.

The beam member 52 is arranged in a radial direction, and in addition to this arrangement, a beam member 54 may be provided for connecting between the radially disposed beam members 52 as occasion demands.

The iron plate member 52 serving as the concrete member mold frame which constitutes the diaphragm floor 1 is supported by the steel beam member 52.

The reinforcement member 53 is arranged at the zone where the concrete member is poured with the completion of a layer. Further, in the diaphragm floor module 71, a part of an operation stand member 55 and machinery and materials are integrally embodied, and further, the part of the operation stand member 55 and the machinery and materials are simultaneously suspended using a giant lifting machine.

The part of the operation stand member 55 is arranged in the nuclear reactor reinforced concrete containment vessel (RCCV) 3 and the machinery and materials, such as a piping member, is provided in the wet wall 14.

FIG. 5 is a cross-sectional view showing an example of an embodied module taken from a lateral direction. The embodied module comprises the iron plate member 51 serving as the concrete member mold frame for constituting the diaphragm floor 1, the beam member 52 for supporting the iron plate member 51, the reinforcement member 53 and the operation stand member 55 which is installed on the upper portion of the wet well 14.

Next, a method for installing the diaphragm floor module 71 in the nuclear reactor building construction 2 will be explained.

Figure 6:
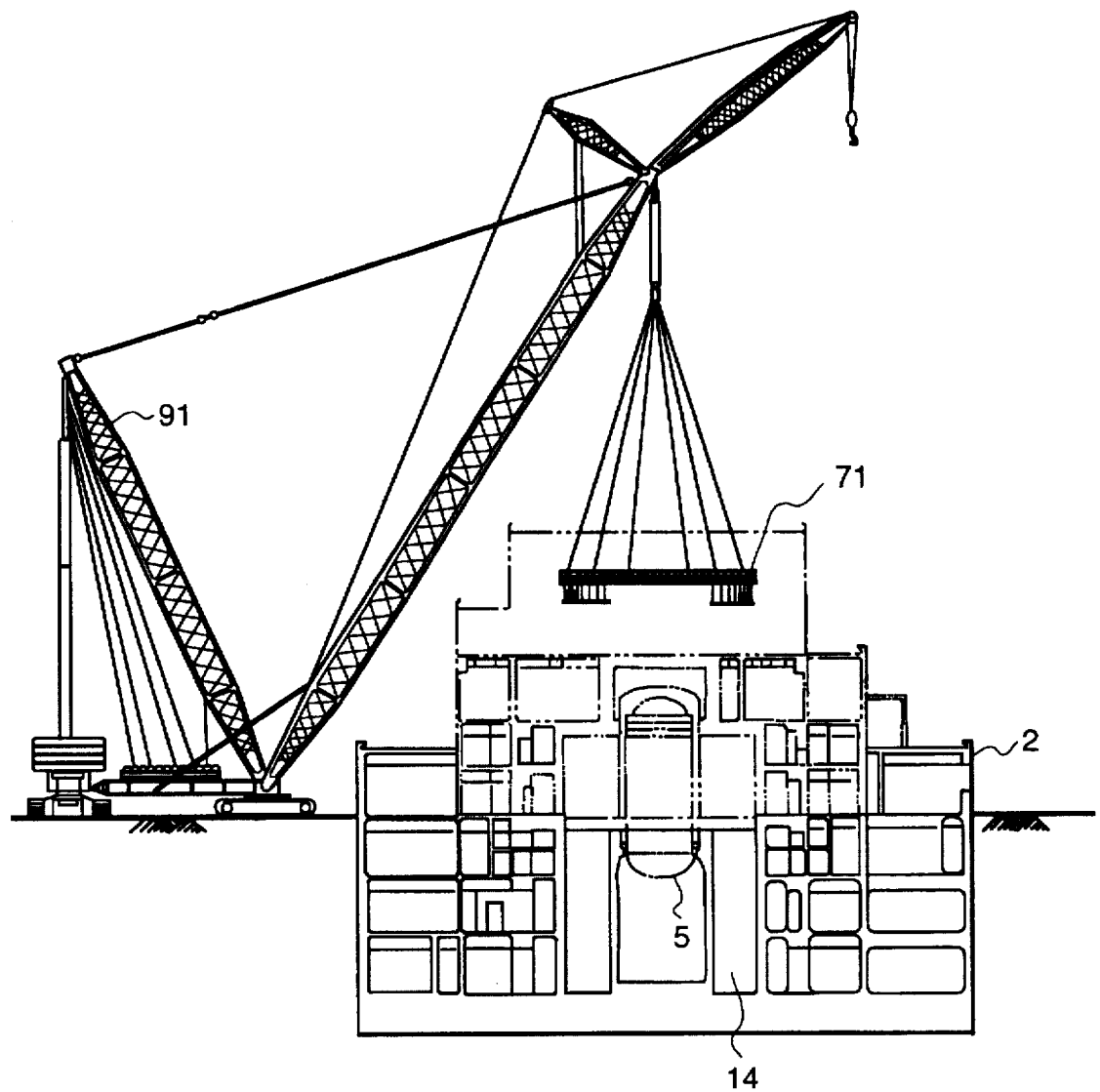
FIG. 6 is an elevation view showing the installing of a diaphragm floor module adopted by a nuclear reactor building construction of a nuclear reactor reinforced concrete containment vessel according to the present invention.

FIG. 6 is a view showing the installation of the diaphragm floor module 71 using a large scale movable crane 91.

In FIG. 6, a region indicated by a two-dot broken line shows a region where the nuclear reactor building construction 2 is not completed at the time of installation of the diaphragm floor module 71.

However, it should be understood that the whole diaphragm floor module 71 may be installed as one module in the nuclear reactor building construction 2 or in the diaphragm floor module 71 may be installed in the nuclear reactor building construction 2 by dividing it into parts in case the capacity of the movable crane 91 is insufficient.

In the above stated method in which the diaphragm floor module 71 is installed in parts, the circular shape diaphragm floor module 71 may be divided into two parts, three parts, four parts or six parts, for example, in the longitudinal direction.

Further, as a method of dividing the diaphragm floor module 71 in the horizontal direction, the iron plate member 51 serving as the concrete member mold frame of the bottom portion of the diaphragm floor module 71 and the beam member 52 for supporting the iron plate member 51 are integrally formed and can be carried in individually, followed by the beam member 53.

Figure 7:
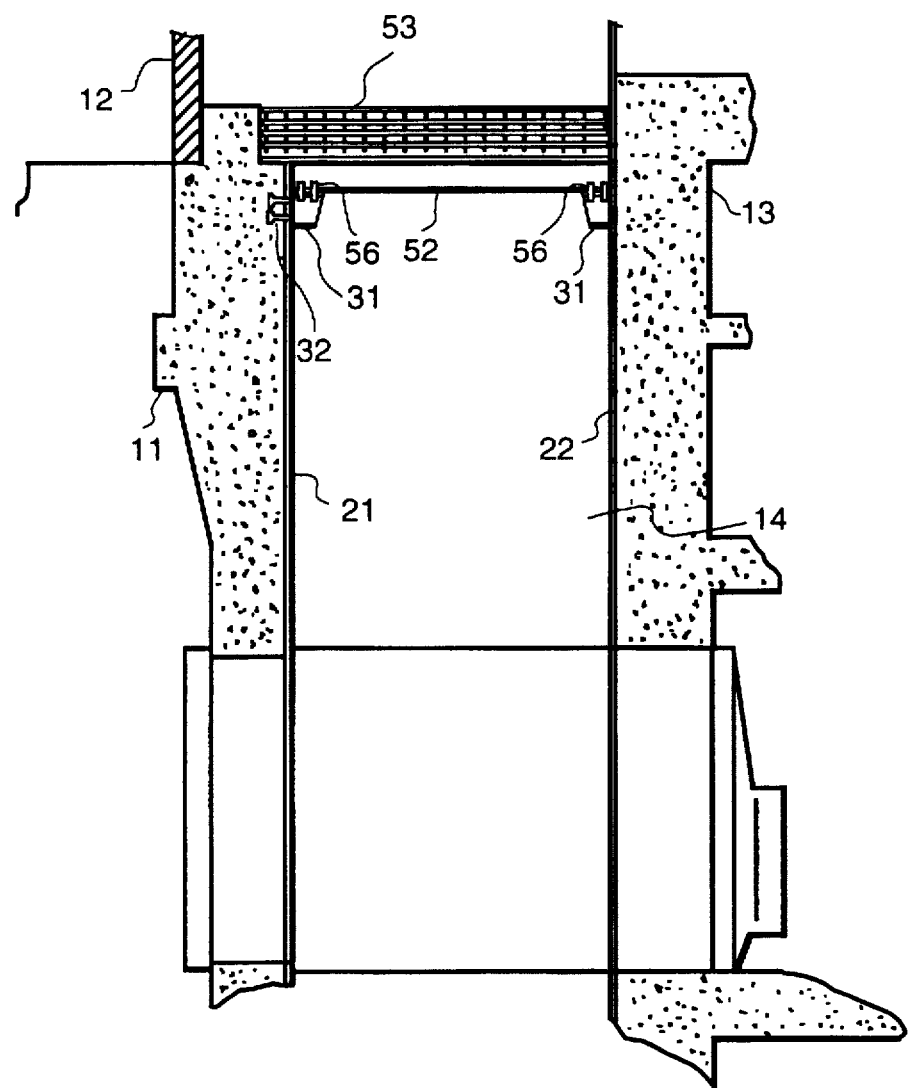
FIG. 7 is a longitudinal cross-sectional view showing a condition after installation of a diaphragm floor module adopted by a nuclear reactor building construction of a nuclear reactor reinforced concrete containment vessel according to the present invention.

FIG. 7 is a cross-sectional view showing a completed installation of the diaphragm floor module 71, excluding the stand arranged at the wet well 14 on a predetermined position in the nuclear reactor reinforced concrete containment vessel (RCCV) 3.

The installation of the diaphragm floor module 71, excluding the stand member, is performed by fixing the beam member 52 to the bracket member 31, by a welding process, as occasion demands.

Figure 8:
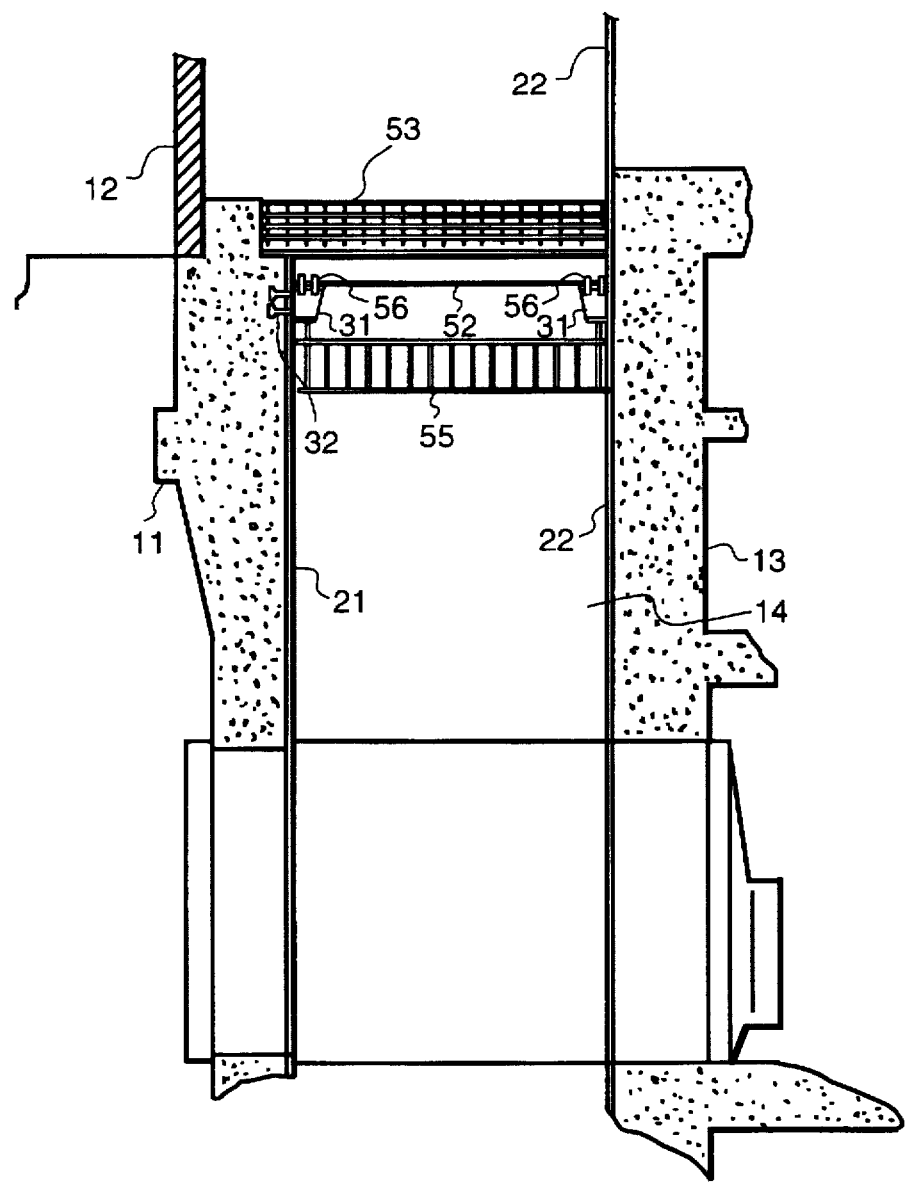
FIG. 8 is a longitudinal cross-sectional view showing a condition after installation of a diaphragm floor module adopted by a nuclear reactor building construction of a nuclear reactor reinforced concrete containment vessel according to the present invention.

Further, FIG. 8 is a cross-sectional view showing an installation condition of the diaphragm floor module 71 on a predetermined position in the nuclear reactor reinforced concrete containment vessel (RCCV) 3, in which the stand member 55 arranged in the wet well 14 is integrally mounted on the diaphragm floor module 71.

In the case where the bracket member 31 shown in FIG. 3 is used, similar to the case where another opposite side bracket member 31 is used, the beam member 52 of the diaphragm floor module 71 is mounted on an upper end face of the bracket member 31, and the bracket member 31 and the diaphragm floor module 71 are fixed by bolts and nuts 56; although, the bracket member 31 and the diaphragm floor module 71 may be fixed by a welding process, as occasion demands.

Next, a method of pouring the concrete for the diaphragm floor 1 using the above stated embodiment of the construction method of the nuclear reactor concrete containment vessel (RCCV) according to the present invention will be explained.

In this embodiment of the construction method of the nuclear reactor concrete containment vessel (RCCV) according to the present invention, consideration is given to the eliminating a need for the temporary member for supporting the concrete member weight, as used previously during the pouring of the concrete for the diaphragm floor 1.

The present invention is based on the recognition that, while the concrete which has been poured presents a fluid state, the concrete member is not able to bear a load; however, after a while, the concrete hardens, and the concrete member becomes to have the strength necessary to bear a load. Thereby, in accordance with the present invention, the above stated characteristic or property inherent in the concrete is utilized.

More specifically, the concrete member constituting the reinforced concrete member is divided into plural layers, the divided layers of the concrete member being poured one at a time while allowing each layer to harden before the next layer is poured.

The reasons why the invention is able to use only the support member, which has a weak strength and is unable to support the whole concrete member if poured at one time, is that the first concrete layer can bear the weight of subsequent layers during the concrete pouring.

Namely, after the diaphragm floor module 71 has been carried in and positioned, a first concrete pouring is effected with only a part of the whole concrete pouring amount. The first concrete pouring is performed under a condition where the diaphragm floor module 71 is fixed by the bolts 56.

Figure 9:
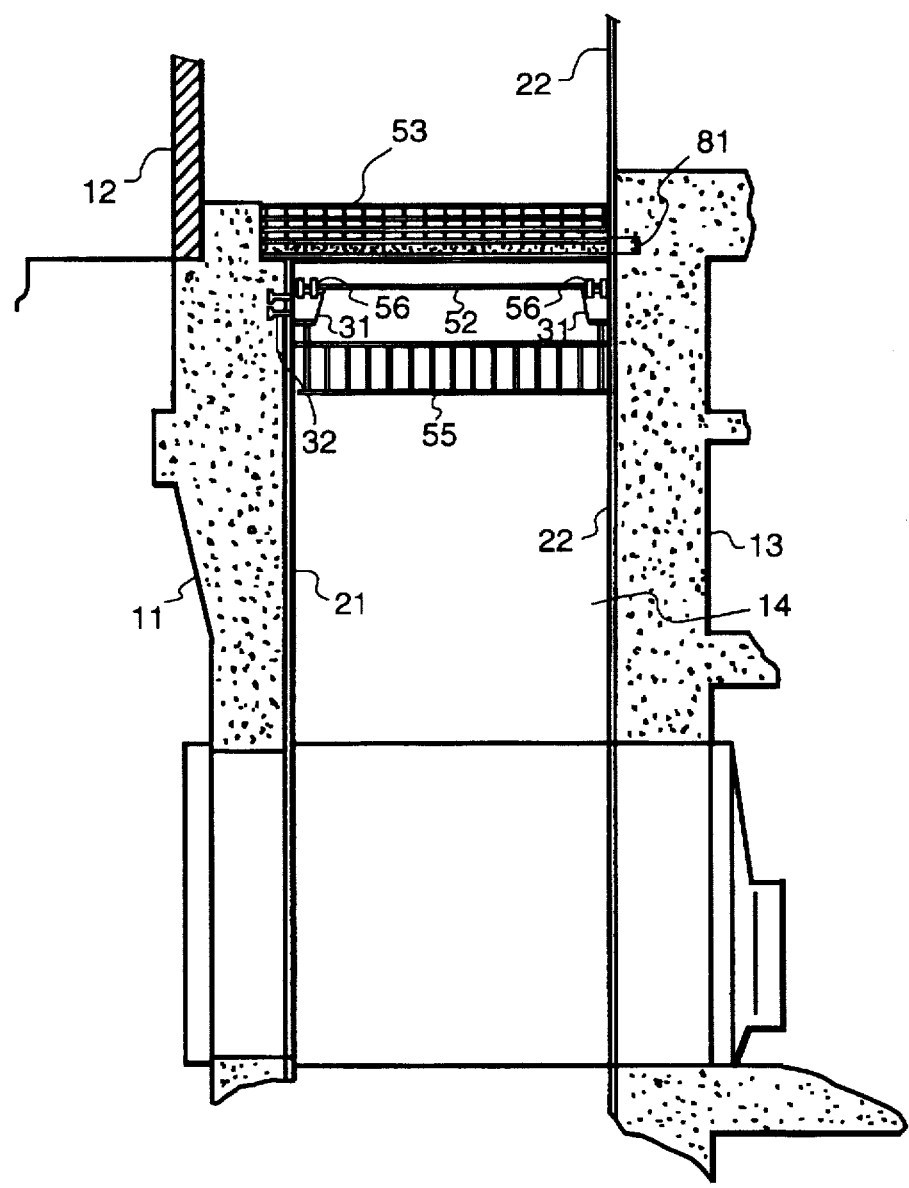
FIG. 9 is a longitudinal cross-sectional view showing a condition of a first concrete layer pouring of the diaphragm floor module of FIG. 8.

Under the above stated condition, as seen in FIG. 9, a range 81 for pouring the first concrete layer is employed and the concrete is left until it hardens to a point where it has the strength for bearing the load of another layer of concrete.

In FIG. 9, a condition where the concrete member has been poured to form a first concrete layer in a pouring range 81 is shown.

Figure 10:
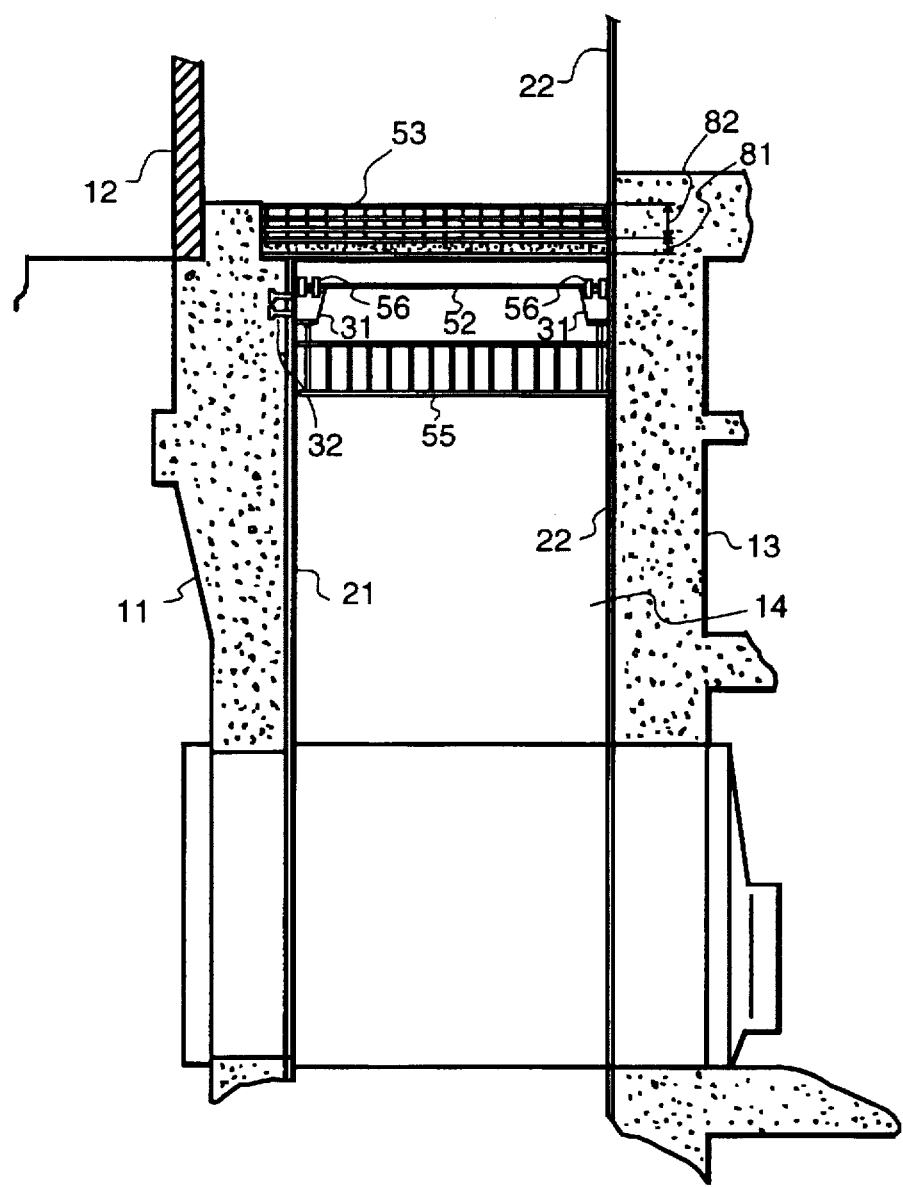
FIG. 10 is a longitudinal cross-sectional view showing a condition of a next concrete layer pouring to the diaphragm floor module of FIG. 9.

The first concrete layer in the pouring range 81 is allowed to harden until it reaches the condition where the concrete is able to fully bear a load, that is where the first concrete layer has the strength for bearing the weight of another concrete layer. After that, a second concrete pouring is performed to a second concrete pouring range 82, as seen in FIG. 10.

In this case, to the strength of the beam member 52, which was installed at the beginning, there is added the strength of the first concrete layer in the pouring range 81, which concrete layer has already been completed and has consolidated, so that it is possible to pour a greater amount of concrete for the second pouring than the amount poured for the first concrete layer.

FIG. 8 shows a condition where the second concrete pouring has been performed.

Further, it may be desirable to carry out the pouring of the concrete by dividing the member into more than two layers, as occasion demands.

In the above stated embodiment of the present invention, since the beam members 52 and 54 and the iron plate member 51 for supporting the load during the concrete pouring is permanently installed, the beam members 52 and 54 and the iron plate member 51 are not withdrawn after the completion of the diaphragm floor 1.

(1) According to the above embodiments of the nuclear reactor reinforced concrete containment vessel of the present invention, it is possible to construct the diaphragm floor by utilizing a beam member for the diaphragm floor having a low strength, and also it is unnecessary to use a temporary member to support the concrete member of the diaphragm floor.

Further, it is possible to reduce the amount and the volume of the reinforcement member, including the real construction and the temporary construction, and also a temporary member is not required in large numbers in the wet well, so that the work in the wet well and the diaphragm floor construction work can be proceed at the same time, with the result that it is possible to reduce the construction time of the nuclear reactor reinforced concrete containment vessel.

(2) According to the above embodiments of the nuclear reactor reinforced concrete containment vessel of the present invention, it is possible to construct the diaphragm floor by utilizing a beam member for the diaphragm floor having a low strength, and it is unnecessary to provide a temporary member to support the concrete member of the diaphragm floor.

Further, it is possible to reduce the amount and the volume of the reinforcement member, including the real construction and the temporary construction, and also a temporary member is not required in large numbers in the wet well, so that the work in the wet well and the diaphragm floor construction work can be proceed at the same time.

In company with the above features, it is possible to easily construct the diaphragm floor by supporting the beam member of the diaphragm floor using the pedestal member and the wall of the nuclear reactor reinforced concrete containment vessel; and, as a result, it is possible to surely reduce the construction time of the nuclear reactor reinforced concrete containment vessel.

(3) According to the above embodiments of the nuclear reactor reinforced concrete containment vessel of the present invention, in addition to the above stated effects shown in the item (2), the constituting member of the diaphragm floor is modularized and it is possible to treat the modularized elements during the installation at the same time, so that it is possible to surely reduce the construction time of the nuclear reactor reinforced concrete containment vessel.

(4) According to the above embodiments of the nuclear reactor reinforced concrete containment vessel of the present invention, in addition to the above stated effects shown in the item (3), the machinery and materials being installed in the wet well are integrally modularized with the constituting member of the diaphragm floor and it is possible to treat the machinery and materials and the modularized member at the same time, so that it is possible to surely reduce the construction time the nuclear reactor reinforced concrete containment vessel.

(5) According to the above embodiments of the nuclear reactor reinforced concrete containment vessel of the present invention, in addition to the above stated effects shown in the item (2) or the item (3), it is possible to start the construction of the diaphragm floor without being affected by the construction of the wall of the nuclear reactor container vessel, so that it is possible to extremely avoid any delay of the construction of the nuclear reactor reinforced concrete containment vessel.

(6) According to the above embodiments of the nuclear reactor reinforced concrete containment vessel of the present invention, in addition to the above stated effects shown from the item (1) to the item (5), it is possible to obtain a light weight structure by lowering the strength of the beam member.

(7) According to the above embodiments of the nuclear reactor reinforced concrete containment vessel of the present invention, it is possible to construct the diaphragm floor by utilizing a beam member to support the diaphragm floor which has a weak strength, and also it is possible to employ a method of construction in which a temporary member, previously necessary to support the concrete member of the diaphragm floor, is unnecessary.

Thereby, it is possible to reduce the amount and the volume of the reinforcement member, including the permanent construction and the temporary construction, and it is unnecessary to provide a temporary support member in the wet well, so that the work being performed in the wet well and the diaphragm floor construction work can proceed at the same time. As a result, it is possible to reduce the construction time of the nuclear reactor reinforced concrete containment vessel.

What is claimed is:

1. A method of construction of a nuclear reactor reinforced concrete containment vessel, comprising the steps of:

providing a beam member for a diaphragm floor of said nuclear reactor reinforced concrete containment vessel;

providing a plate member over said beam member;

arranging a first reinforcement member over said plate member;

pouring concretes to a thickness less than a required thickness of said diaphragm floor of said nuclear reactor reinforced concrete containment vessel, on said plate member and said first reinforcement member to form a first concrete layer including said first reinforcement member;

allowing said first concrete layer including said first reinforcement member to harden;

arranging a second reinforcement member over said hardened first concrete layer;

pouring concrete, to a thickness less than a required thickness of said diaphragm floor of said nuclear reactor reinforced concrete containment vessel, on said hardened first concrete layer and said second reinforcement member to form a second concrete layer including said second reinforcement member: and allowing said second concrete layer including said second reinforcement member to harden:

whereby said diaphragm floor of said nuclear reactor reinforced concrete containment vessel is formed to said required thickness.

2. A method of construction of a nuclear reactor reinforced concrete containment vessel, in which a diaphragm floor is installed between a dry well and a wet well of said nuclear reactor reinforced concrete containment vessel for storing a nuclear reactor pressure vessel so that it is supported by a pedestal member, comprising the steps of:

supporting a beam member between said pedestal member and a wall of said nuclear reactor reinforced concrete containment vessel at an installation position of said diaphragm floor of said nuclear reactor reinforced concrete containment vessel;

providing a concrete mold frame over said beam member;

arranging a first reinforcement member over said concrete mold frame;

pouring concrete to a thickness less than a required thickness of a diaphragm floor of said nuclear reactor reinforced concrete containment vessel on said mold frame and said first reinforcement member to form a first concrete layer including said first reinforcement member;

allowing said concrete layer including said first reinforcement member to harden;

providing a second reinforcement member on said hardened first concrete layer;

pouring concrete to a thickness less than a required thickness of said diaphragm floor of said nuclear reactor reinforced concrete containment vessel on said hardened first concrete layer and said second reiforcement member to form a second concrete layer including said second reinforcement member; and allowing said second concrete layer including said second reinforcement member to harden;

so that said diaphragm floor of said nuclear reactor reinforced concrete containment vessel is formed to said required thickness.

3. A method of construction of a nuclear reactor reinforced concrete containment vessel according to claim 2, further comprising the steps of:

manufacturing in advance a diaphragm module including at least one of said concrete mold frame and a reinforcement member, and said beam member; and setting said diaphragm module so as to mount said beam member on said pedestal member, a bracket member which is installed in advance and on a wall of said nuclear reactor reinforced concrete containment vessel, whereby said beam member is supported by said pedestal member and said wall of said nuclear reactor reinforced concrete containment vessel.

4. A method of construction of a nuclear reactor reinforced concrete containment vessel according to claim 3, further comprising the step of:

preparing said diaphragm module by integrally embodying at least one of said concrete mold frame and a reinforcement member, said beam member and machinery and materials being integrally arranged in said wet well.

5. A method of construction of a nuclear reactor reinforced concrete containment vessel according to claim 2 or claim 3, further comprising the steps of:

building said wall of said nuclear reactor reinforced concrete containment vessel to a height less than an installing position of said diaphragm floor;

mounting a bracket member on said wall, said bracket member having a length sufficient to reach to an installing position of said diaphragm floor; and mounting said beam member on said bracket member.

6. A method of construction of a nuclear reactor reinforced concrete containment vessel according to claim 1, the strength of said beam member is less than a strength necessary to support the weight of concrete having said required thickness of said diaphragm floor; and said strength is set to an amount which is sufficient to support the weight of said first concrete layer having less thickness than said required thickness of said diaphragm floor.

7. A diaphragm floor made of reinforced concrete which is supported by a pedestal member of a nuclear reactor pressure vessel and a wall of a nuclear reactor reinforced concrete containment vessel, said diaphragm floor comprising:

a beam member supporting a bottom floor of said diaphragm floor by said pedestal member of said nuclear reactor reinforced concrete containment vessel and said wall of said nuclear reactor reinforced concrete containment vessel;

a concrete mold frame supported by said beam member;

a reinforcement member provided on said concrete mold frame; and a concrete member formed of plural individual layers of concrete poured on said concrete member mold frame at different times until a thickness is reached wherein said reinforcement member is buried, and wherein said beam member has a strength less than the strength required to support the total weight of concrete necessary to form the required thickness of said diaphragm floor; and said strength is set to an amount which is sufficient to support the weight of a first concrete layer having less thickness than said required thickness of said diaphragm floor.

8. A method of construction of a nuclear reactor reinforced concrete containment vessel, comprising of the steps of:

providing a beam member for a diaphragm floor of said nuclear reactor reinforced concrete containment vessel;

providing a plate member or a concrete mold frame over said beam member;

arranging a first reinforcement member over said plate member or said concrete mold frame;

pouring concrete, to a thickness less than a required thickness of said diaphragm floor of said nuclear reactor reinforced concrete containment vessel, on said plate member or said concrete mold frame and on said first reinforcement member to form a first concrete layer including said first reinforcement member;

allowing said first concrete layer including said first reinforcement member to harden;

arranging a second reinforcement member over said hardened first concrete layer;

pouring concrete, to a thickness less than a required thickness of said diaphragm floor of said nuclear reactor reinforced concrete containment vessel, on said hardened first concrete layer and on said second reinforcement member to form a second concrete layer including said second reinforcement member;

allowing said second concrete layer including said second reinforcement member to harden;

arranging a third reinforcement member over said hardened second concrete layer;

pouring concrete, to a thickness less than a required thickness of said diaphragm floor of said nuclear reactor reinforced concrete containment vessel, on said hardened second concrete layer and on said third reinforcement member to form a third concrete layer including said third reinforcement member; and allowing said third concrete layer including said third reinforcement member to harden;

whereby said diaphragm floor of said nuclear reactor reinforced concrete containment vessel is formed to said required thickness.

9. A diaphragm floor made of a reinforced concrete of a nuclear reactor reinforced concrete containment vessel, said diaphragm floor of said nuclear reactor reinforced concrete containment vessel comprising:

a beam member supported by a bottom floor of said diaphragm floor of said nuclear reactor reinforced concrete containment vessel;

a plate member or a concrete mold frame provided over said beam member;

a first hardened concrete layer including a first reinforcement member provided over said plate member or said concrete mold frame, said first hardened concrete layer having a first concrete member poured and hardened on said plate member or said concrete mold frame and on said first reinforcement member, said first reinforcement member buried by said first concrete member, and said first concrete member having a thickness less than a required thickness of said diaphragm floor of said nuclear reinforced concrete containment vessel; and a second hardened concrete layer including a second reinforcement member provided over said first hardened concrete layer, said second hardened concrete layer having a second concrete member poured and hardened on said first hardened concrete layer including said first reinforcement member and on said second reinforcement member, said second reinforcement member buried by said second concrete member, and said second concrete member having a thickness less than a required thickness of said diaphragm floor of said nuclear reinforced concrete containment vessel;

whereby said diaphragm floor of said nuclear reactor reinforced concrete containment vessel is formed to said required thickness.

10. A diaphragm floor made of a reinforced concrete of a nuclear reactor reinforced concrete containment vessel, said diaphragm floor of said nuclear reactor reinforced concrete containment vessel comprising:

- a beam member supported by a bottom floor of said diaphragm floor of said nuclear reactor reinforced concrete containment vessel;
- a plate member or a concrete mold frame provided over said beam member;
- a first hardened concrete layer including a first reinforcement member provided over said plate member or said concrete mold frame, said first hardened concrete layer having a first concrete member poured and hardened on said plate member or said concrete mold frame and on said first reinforcement member, said first reinforcement member buried by said first concrete member, and said first concrete member having a thickness less than a required thickness of said diaphragm floor of said nuclear reinforced concrete containment vessel;
- a second hardened concrete layer including a second reinforcement member provided over said first hardened concrete layer, said second hardened concrete layer having a second concrete member poured and hardened on said first concrete layer including said first reinforcement member and on said second reinforcement member, said second reinforcement member buried by said second concrete member, and said second concrete member having a thickness less than a required thickness of said diaphragm floor of said nuclear reinforced concrete containment vessel; and
- a third hardened concrete layer including a third reinforcement member provided over said second hardened concrete layer, said third hardened concrete layer having a third concrete member poured and hardened on said second concrete layer including said second reinforcement member and on said third reinforcement member, said third reinforcement member buried by said third concrete member, and said third concrete member having a thickness less than a required thickness of said diaphragm floor of said nuclear reinforced concrete containment vessel;

whereby said diaphragm floor of said nuclear reactor reinforced concrete containment vessel is formed to said required thickness.

11. A diaphragm floor made of a reinforced concrete which is supported by a pedestal member of a nuclear reactor pressure vessel and a wall of a nuclear reactor reinforced concrete containment vessel, said diaphragm floor of said nuclear reactor reinforced concrete containment vessel comprising:

- a beam member supported by a bottom floor of said diaphragm floor by said pedestal member of said nuclear reactor reinforced concrete containment vessel and said wall of said nuclear reactor reinforced concrete containment vessel;
- a plate member of a concrete mold frame provided over said beam member;
- a first concrete layer including a first reinforcement member provided on said plate member or said concrete mold frame, said first concrete layer having a first concrete member poured on said plate member or said concrete mold frame and said first reinforcement member, and said first concrete layer having a thickness less than a required thickness of said diaphragm floor of said nuclear reinforced concrete containment vessel; and
- a second concrete layer including a second reinforcement member provided on said first concrete layer, said second concrete layer having a second concrete member poured on said first concrete layer including said first reinforcement member and on said second reinforcement member, and said second concrete having a thickness less than a required thickness of said diaphragm floor of said nuclear reinforced concrete containment vessel;

whereby said diaphragm floor of said nuclear reactor reinforced concrete containment vessel is formed to said required thickness.

* * * * *